INVENTOR.
John R. Dornan
BY
Charles W. Gregg
AGENT

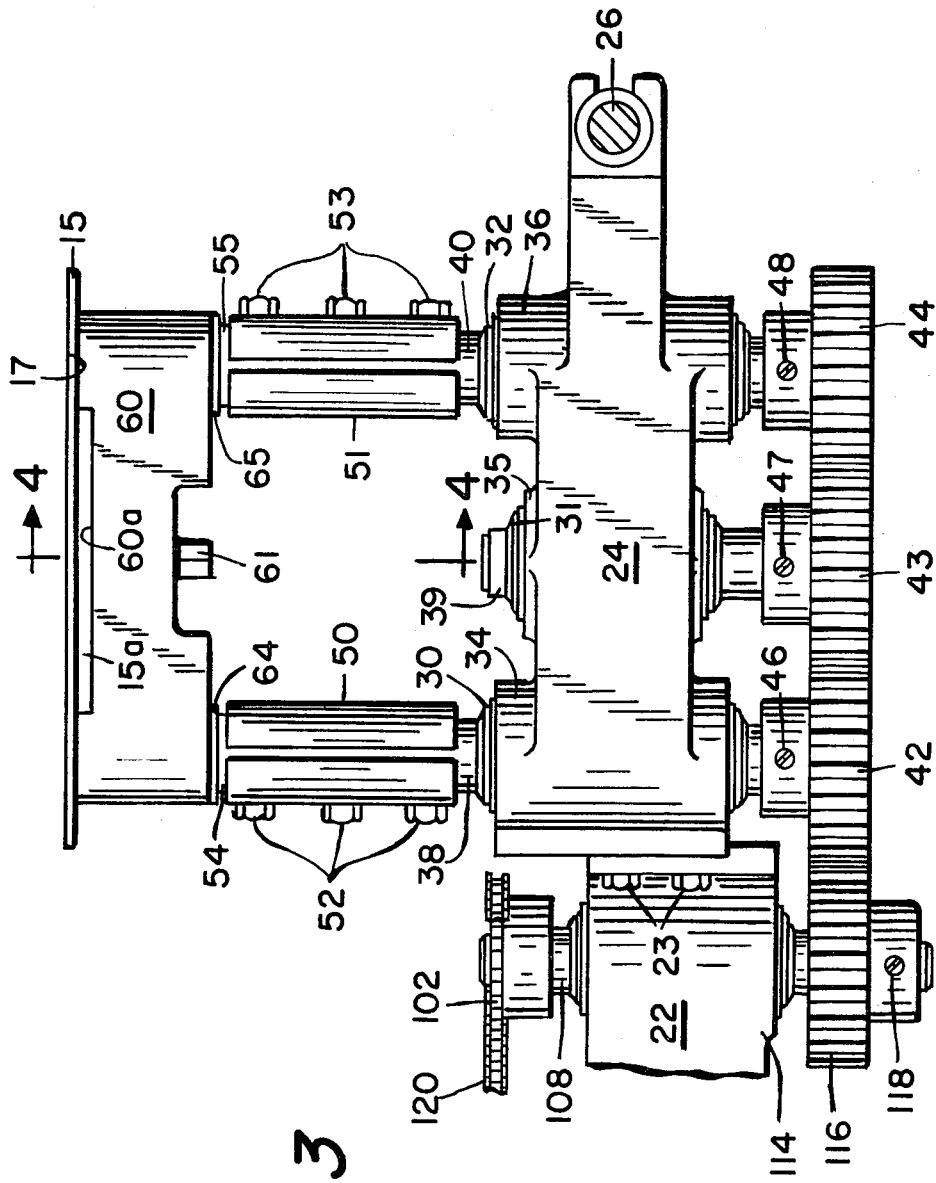

United States Patent Office 3,677,732
Patented July 18, 1972

3,677,732
MOLTEN GLASS SHEARS
John R. Dornan, Corning, N.Y., assignor to Corning
Glass Works, Corning, N.Y.
Filed Feb. 1, 1971, Ser. No. 111,327
Int. Cl. C03b 5/38
U.S. Cl. 65—133
25 Claims

ABSTRACT OF THE DISCLOSURE

Molten glass shears for separating, cutting or severing gobs or mold charges of molten glass from a stream thereof issuing from an outlet orifice of a glass tank, feeder, forehearth or other type of container. The shears comprise first and second blades preferably having straight or linear cutting edges which are disposed on opposite sides of the molten glass stream preferably at right angles to the longitudinal axis thereof, and are preferably so disposed with the cutting edges in a facing and parallel coplanar relationship or orientation with each other. The output shaft of a motor means is coupled with the shear blades to move the cutting edges through curved paths of movement, and into and out of at least near wiping or sliding contact with each other while imparting a slicing motion to each cutting edge during continued maintenance of said preferred relationship therebetween. The slicing motions of the cutting edges are preferably, but need not necessarily be, in directions opposite to each other during each respective glass severance operation, and the slicing motions of each respective blade are preferably, but need not necessarily be, in opposite directions during alternate succeeding ones of a succession of glass severance or shearing operations.

BACKGROUND OF THE INVENTION

As is well known in the glass making art, in the forming of many types of glass articles, gobs or mold charges of molten glass are cut, separated or severed from parent streams of molten glass by so-called glass shears, such streams issuing from the outlet orifice of tanks, feeders, forehearths or other types of containers. The cut or severed gobs or mold charges are delivered to forming molds for pressing or otherwise forming of the molten glass gobs or charges into the desired types of finished glass articles. Numerous types of glass shears have heretofore been known and employed for said use, and most of said types comprise a pair of blades having cutting edges which pass each other or overlap in a scissor-like and mutual sliding manner during glass severance or cutting operations of the type mentioned above. Such types of shears often cause defects or irregularities which are formed in the gobs or mold charges as they are cut by the shears, and which are carried over to the glass articles subsequently formed from the molten glass gobs or mold charges. The defects or irregularities in the finally formed glass articles are in the form of scars which are commonly termed shear marks and finished glass articles having exceptionally obvious or exceptionally apparent shear marks must often be rejected as unacceptable or intolerably defective. New types of glass shears which would substantially reduce or completely eliminate the occurrence of shear marks in finished glass articles have, therefore, long been and are currently being sought. Accordingly, the molten glass shears of the present invention were developed.

SUMMARY OF THE INVENTION

The molten glass shears of the present invention comprise a pair of blades each preferably having a straight or linear cutting edge. A first of such blades is disposed on a first side of the flow path of a stream of molten glass issuing from an outlet orifice with the cutting edge of such blade being a selected distance from such flow path and preferably positioned at a right angle to the axial centerline of said orifice, that is, at a right angle to the longitudinal center axis of said glass stream or flow path. The second of said blades is similarly disposed on the opposite side of said flow path with the cutting edge of such second blade at said selected distance from such path and preferably in a coplanar facing and parallel coplanar relationship or orientation with the cutting edge of the first blade. Motor means are provided and the output shaft thereof is coupled to said blades to move the cutting edges of the blades into and partially through said glass stream, preferably with slicing motions of such edges in opposite directions, and into at least near wiping or sliding contact with each other at said center axis of said molten glass stream while maintaining said preferred relationship between said cutting edges. A gob or mold charge of molten glass is thereby cut or severed from said glass stream and, immediately following said near or actual contact, the blades and their cutting edges are retracted by said motor means to their original positions in preparation for another gob severing actuation or movement of the blades and their cutting edges. The direction of the aforesaid slicing motion of each of the cutting edges of the blades during each successive actuation thereof is preferably, but need not necessarily be, in a direction opposite to that of each respective preceding actuation of each of the respective cutting edges.

Other objects and characteristic features of the invention will become apparent as the description proceeds.

BRIEF DESCRIPTION OF THE DRAWINGS

In the drawings:

FIG. 3 is an elevational view of part of the apparatus of FIG. 2, such view being taken generally along line 3—3 of FIG. 2;

FIG. 4 comprises an elevational view partially in section, such view being taken generally along line 4—4 of FIG. 3.

Similar reference characters refer to similar parts in each of the figures of the drawings.

PREFERRED EMBODIMENT OF THE INVENTION

Figure 1:
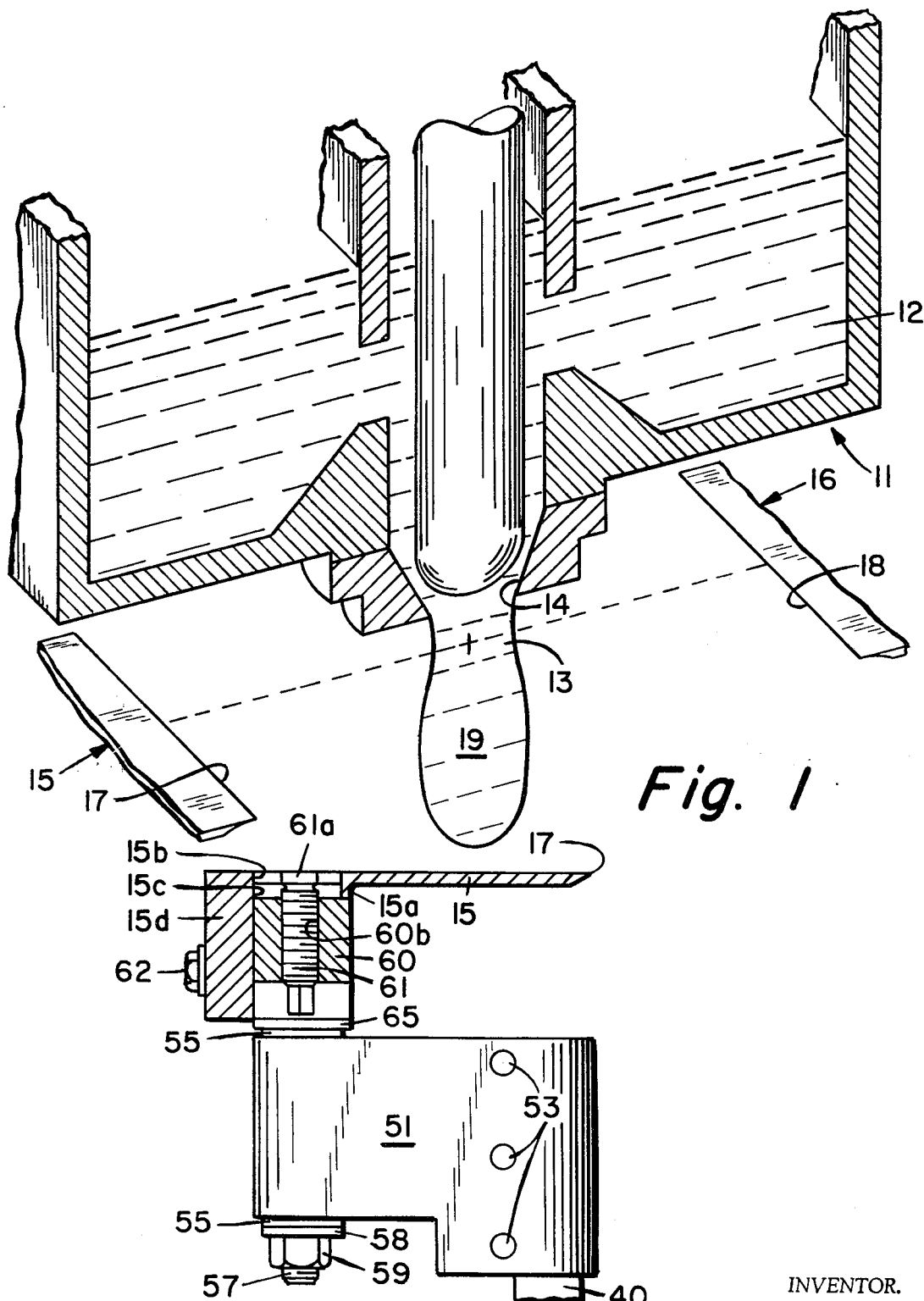
FIG. 1 is an isometric view partially in section illustrating a feeder or molten glass container such as a forehearth with the cutting edges of shear blades, in accordance with the invention, shown in a position preparatory to a movement of the cutting edges in a gob cutting operation thereof.

FIG. 1 of the drawings illustrates a molten glass container, tank or feeder such as a forehearth 11 in which molten glass 12 is being delivered or issued in a downwardly flowing stream 13 from an outlet orifice 14. First and second shear blades 15 and 16 having cutting edges 17 and 18, respectively, are shown disposed on opposite sides of the glass stream 13 with said cutting edges oriented in a parallel and facing coplanar relationship with each other below said outlet orifice 14 and substantially equidistant from the axial centerline of such orifice. Said cutting edges 17 and 18 are oriented as described so that they may be periodically operated or moved to cut or sever an end portion of the glass stream 13 to provide a mold charge or gob 19 as is well known in the art.

Figure 2:
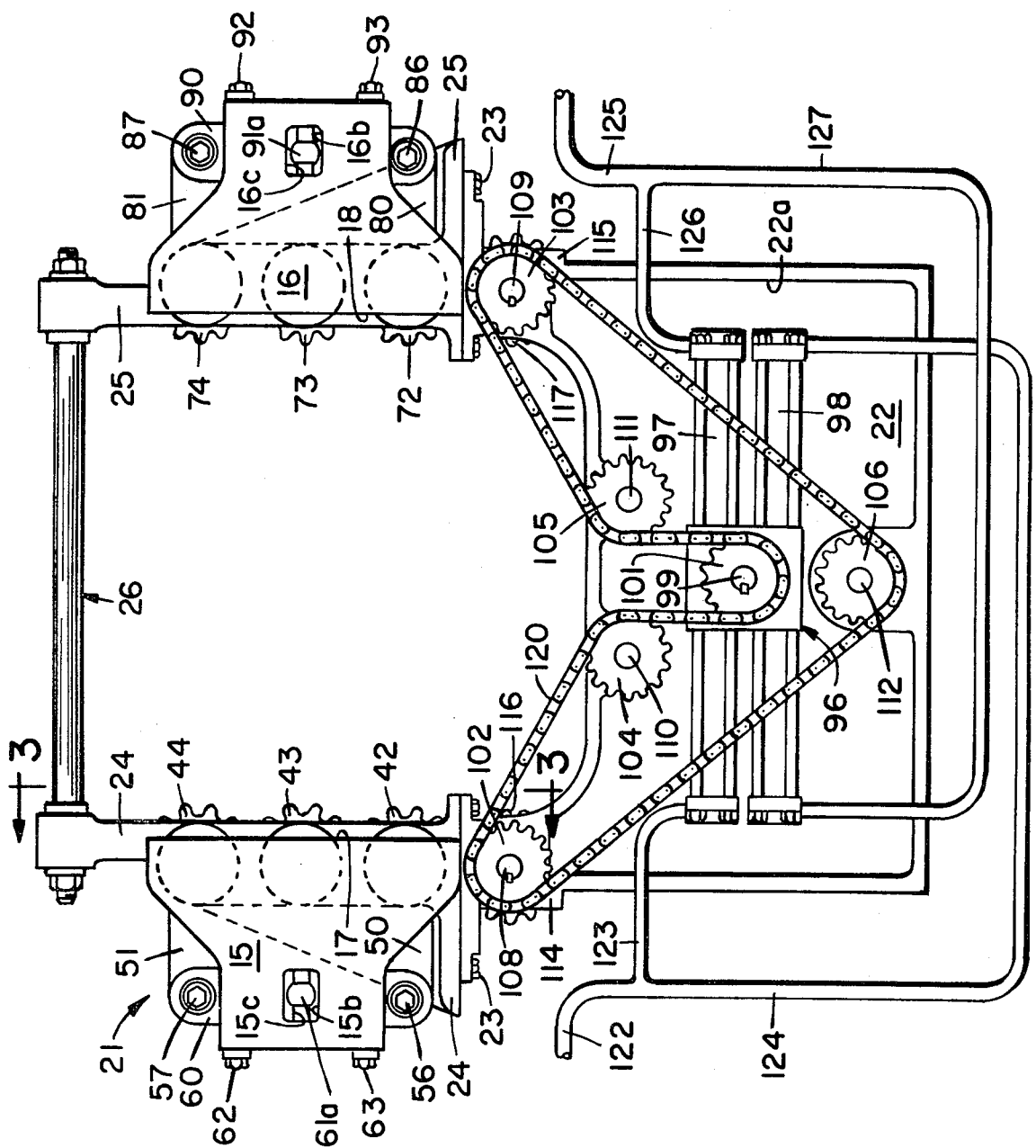
FIG. 2 is a top plan view illustrating the molten glass shears of the invention preparatory to a gob cutting operation similarly as shown in FIG. 1.

Referring now to FIG. 2, taken in conjunction with FIGS. 3 and 4, the structure of the molten glass shear mechanism or the glass shears 21 embodying the invention are shown as comprising a main support member and motor housing 22 to which is secured, as by bolts such as 23, support members or arms 24 and 25 which extend outwardly from main support member 22. Support member 22 is positioned or mounted below and laterally to said outlet orifice 14 of the tank or the forehearth such as 11 so that shear blades 15 and 16 are positioned in the manner previously mentioned and as will be hereinafter further discussed. The manner of mounting member 22 in the position mentioned is immaterial to the present invention and is not shown in the drawings for purposes of simplification thereof. However, it is pointed out that support member 22 may, for example, be suitably attached to the exterior wall of container or forehearth 11, or may be mounted in the desired position for such support member in any of the other manners well known in the art. The ends of a spacing or tie rod 26 extends through the otherwise free ends of support arms 24 and 25 and are secured thereto to supply rigidity to such arms as will be readily apparent to those skilled in the art.

Since the structure of the support and operating apparatus respectively associated with each of the shear blades 15 and 16 is similar, that is, each such structure is a mirror image of the other, only the structure of the support and operating apparatus for shear blade 15 will be discussed in any substantial detail.

Again referring to FIGS. 2, 3 and 4 of the drawings, support arm 24 embodies a set of three aligned sleeve type bearings 30, 31 and 32 (FIG. 3) which extend through and are supported in enlarged boss portions 34, 35 and 36, respectively, of arm 24. A set of axles 38, 39 and 40 extend through bearings 30, 31 and 32, respectively, and are rotatable therein but are restricted against any appreciable longitudinal movement within their respective bearings in any of the well known manners. Gear wheels 42, 43 and 44 having intermeshing teeth are mounted on the lower ends of axles 38, 39 and 40, respectively, and are keyed thereto for support thereon and for rotation of the axles with the respective gear wheels, such keying being accomplished by set screws 46, 47 and 48 extending through hub portions of gear wheels 42, 43 and 44, respectively. Axle or shaft 39 and its associated gear wheel 43 are merely for the purpose of imparting corresponding rotation to gear wheels 42 and 44 and their respectively associated shafts or axles 38 and 40 as is believed readily apparent.

First ends of crank arms 50 and 51 substantially surround and are clamped to the upper ends of shafts or axles 38 and 40, respectively, by threaded bolts such as 52 (FIG. 3) and 53 (FIGS. 2 and 3) screwed into suitably threaded holes extending through the respective crank arms near said first ends thereof. Said first ends of crank arms 50 and 51 are split as shown in FIG. 3 and the bolts such as 51 and 52 are screwed tightly into their respective threaded holes to draw the first ends of the crank arms into tight contact with the upper ends of shafts or axles 38 and 40, and thereby clamp the crank arms to the axles as previously mentioned. Crank arms 50 and 51 are, therefore, clamped to their respectively associated axles for rotation therewith.

The second end of crank arm 51 is shown in FIG. 4 as provided with and supporting a sleeve bearing 55 through which the lower end of a suitable shaft or axle 57 extends and is suitably rotatably supported therein. (See also FIG. 2.) The second end of crank arm 50 is similarly provided with and supports a sleeve bearing 54 (FIG. 3) through which the lower end of a suitable shaft or axle 56 (FIG. 2) extends but the details of such arrangement are not shown in the drawings for purposes of simplification thereof. However, the arrangement of bearing 54 and its associated shaft or axle 56 will be readily apparent from the similar arrangement of bearing 55 and its associated shaft or axle 57. The lower end of axle 57 is threaded and is provided with a washer 58 and a nut 59 which is screwed onto the threaded lower end of the axle to hold it snugly but rotatably in bearing 55 (FIG. 4). A shear blade supporting crossarm 60 is shown in FIGS. 2, 3 and 4, and the upper ends of axles 56 (FIG. 2) and 57 extend upwardly through crossarm 60 adjacent first and second ends thereof, respectively. Crossarm 60 is securely keyed or fastened to the upper ends of axles 56 and 57 in any of the convenient and suitable well known manners. Shear blade supporting crossarm 60 supports shear blade 15 in the manner described below.

Shear blade 15 towards its back end, that is, towards the end opposite the cutting edge 17 of such blade, is provided with a thickened portion 15a (FIGS. 3 and 4) which precisely or snugly fits in a channel 60a provided in the top surface of crossarm 60 as best illustrated in FIG. 3. Thickened portion 15a of shear blade 15 embodies a groove or channel 15b (FIGS. 2 and 4) extending downwardly approximately halfway through said portion 15a and a slot 15c extending downwardly through the remainder of the thickened portion 15a of shear blade 15, such slot being narrower in width than channel 15b. Crossarm 60 is provided at its center with a threaded hole 60b extending completely through the crossarm and a bolt 61 is screwed into said hole until the under surface of the wide portion of head 61a thereof is drawn down against the shoulders provided by slot 15c in the bottom of channel 15b (FIG. 2). Bolts 62 and 63 extend through suitable slots provided in a depending rear portion 15d (FIG. 4) of shear blade 15 and into cooperatively threaded holes provided in the rear wall of crossarm 60. Such slots and holes are not illustrated in the drawings for purposes of simplification thereof. Shear blade 15 is thus securely attached to crossarm 60 by bolts 61, 62 and 63. Washers or spacers 64 and 65 are provided between the lower surface of crossarm 60 and the surfaces of the upper ends of bearings 54 and 55 (FIGS. 3 and 4).

As previously mentioned the structure of the support and operating apparatus for shear blade 16 is a mirror image of that for shear blade 15 and no detailed discussion of the structure of the support and operating apparatus for shear blade 16 is, therefore, considered necessary. However, it is pointed out that the components and parts designated in the drawings by the reference characters 16b, 16c, 72, 73, 74, 80, 81, 86, 87, 90, 91a, 92 and 93 correspond respectively to the components and parts associated with shear blade 15 and designated 15b, 15c, 42, 43, 44, 50, 51, 56, 57, 60, 61a, 62 and 63.

Figure 5:
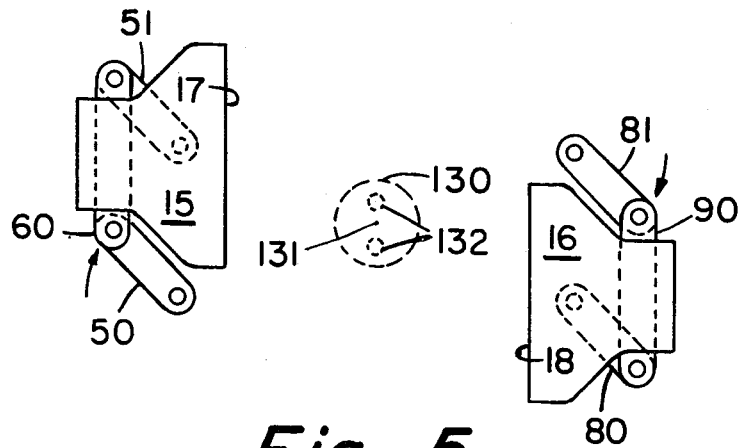
FIGS. 5 through 9 comprise a series of schematic views illustrating the movement of the shear blades and their cutting edges during a gob cutting operation.
Figure 6:
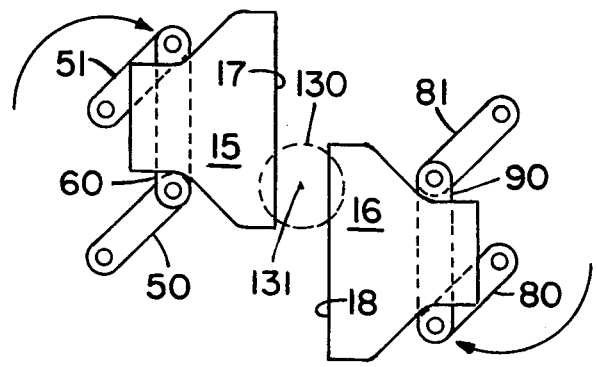

Previously mentioned main support member and motor housing 22 (FIG. 2) embodies a relatively shallow cavity 22a in which is disposed a motor means suitable for actuation of the shear blades and their cutting edges as hereinafter further discussed in more detail. Such motor means are shown in FIG. 2 of the drawings as a pressurized fluid actuated motor means designated 96 and including fluid cylinders or tubes 97 and 98, and a power output shaft 99. Motor means 96 are securely mounted in cavity 22a of member 22 in any suitable manner such as by being bolted to the interior surface of the bottom wall of member 22, and such motor means may, for example, be a rotatably reciprocating fluid actuator such as shown in FIG. 5 of Letters Patent of the U.S. 3,156,160, issued Nov. 10, 1964, to K. H. Meyer et al. and described in such patent. As mentioned in column 1, lines 56 through 63 of such patent, the actuator disclosed therein may be built to provide a selective amount of rotation and, when such an actuator is employed in the apparatus of the present invention, it is preferably built so that the output shaft 99 thereof reciprocatingly rotates through 360° of rotation during each of the periods of energization of the actuator with such rotations being in opposite directions during alternate ones of successive periods of such energization.

It is expedient to point out at this point in the description that, although the present invention is shown and discussed as preferably employing a motor means or actuator such as disclosed in the cited patent to Meyer et al. and discussed above, other types of motor means could as well be employed. For example, the motor means could be a rotary actuator having an output shaft which rotates 360° in the same direction during each successive period of energization thereof. As a further example, the motor means could as well be an electric solenoid actuated motor means. Furthermore, the output shaft of the motor means employed need not necessarily rotate through 360° of rotation during each period of energization thereof but, with the use of different gearing ratios, other degrees of rotation of the output shaft of the motor means could as well drive the apparatus of the invention. This will be readily apparent to those skilled in the art.

A toothed sprocket wheel 101 is mounted on and keyed to the output shaft 99 of motor means 96 so as to be rotationally driven thereby and a pair of similar sprocket wheels 102 and 103 are mounted on and keyed to the upper ends of axles or shafts 108 and 109, respectively, which are rotatably supported in suitable bearings housed in bosses 114 and 115, respectively, provided on member 22. As best illustrated in FIG. 3, a toothed gear wheel 116 is mounted on the lower end of shaft or axle 108 and is keyed thereto for rotation therewith as by a suitable set screw 118 extending through a lower hub portion of gear wheel 116. The teeth of gear wheel 116 mesh with the teeth of previously mentioned gear wheel 42 for driven rotation of the latter gear wheel as hereinafter described, such gear wheels being similar, that is, having the same number of gear teeth. A toothed gear wheel 117 (FIG. 2) is mounted on the lower end of shaft or axle 109 and is keyed thereto for rotation therewith. Gear wheel 117 is similar to gear wheel 72, that is has the same number of gear teeth as gear wheel 72 and the teeth of gear wheels 72 and 117 intermesh in the same manner as mentioned above in connection with gear wheels 42 and 116. The arrangement of gear wheels 117 and 72 will be apparent, therefore, from the similar arrangement of gear wheels 116 and 42 shown in FIG. 3.

A series of idler sprockets wheels 104, 105 and 106 are rotatably mounted on the upper ends of stub axles 110, 111 and 112, respectively, whose lower ends are affixed in suitable bosses provided on member 22. An endless linked drive chain 120 is looped about sprocket wheels 101 through 106 in the usual and well known manner and, thus, rotation of sprocket wheel 101 imparted thereto by output shaft 99 of motor means 96, in turn, imparts rotation to sprocket wheels 102 through 106. If sprocket wheel 101 is rotated in a clockwise direction (viewing FIG. 2) sprocket wheels 102 through 106 are rotated in a counter-clockwise direction and, if sprocket wheel 101 is rotated in a counter-clockwise direction, sprocket wheels 102 through 106 are rotated in a clockwise direction as is all believed readily apparent.

A pressurized fluid conduit 122 shown in FIG. 2 divides into two branches 123 and 124 which connect to left and right hand ends, respectively, of cylinders 97 and 98, respectively. Similarly, a pressurized fluid conduit 125 divides into two branches 126 and 127 which connect to right and left hand ends, respectively, of cylinders 97 and 98, respectively. By such arrangement and as is well known in the art, conduit 122 may be connected to a suitable supply of pressurized fluid while conduit 125 is connected to a suitable fluid sink and motor means 96 will thus be energized or actuated by the pressurized fluid to rotate output shaft 99 through 360° of rotation in a clockwise direction (viewing FIG. 2). Similarly, conduit 125 may be connected to said source or another suitable source of pressurized fluid while conduit 122 is connected to said sink or another suitable fluid sink, and motor means 96 will thus be energized or actuated by the pressurized fluid to rotate output shaft 99 of said motor means through 360° of rotation in a counterclockwise direction. This will be readily apparent to those skilled in the art and, if further details of such operation or actuation of motor means 96 is desired, reference may be made to FIG. 5 of the previously cited patent to Meyer et al.

The structure of the apparatus of the invention having been described in detail, a brief operational example of the invention will now be discussed in conjunction with FIGS. 5 through 9 of the drawings taken in conjunction with FIGS. 1 and 2 thereof.

Referring to FIGS. 5 through 9 there is schematically indicated by a dotted line circle 130 either the inner periphery of an outlet orifice such as 14 (FIG. 1) or the outer perimeter of a stream of molten glass such as 13 (FIG. 1) issuing from said outlet orifice. The dot 131 in the center of circle 130 is intended to schematically indicate either the axial centerline of the orifice such as 14 or the longitudinal axis of the glass stream 13. There is also shown in FIG. 5 two small dotted line circles 132 which are intended to indicate either the inner periphery of each of a spaced-apart pair of small molten glass outlet orifices or the outer perimeter of two spaced apart streams of molten glass issuing from a spaced-apart pair of outlet orifices. The circles such as 132 are shown merely for the purpose of illustrating that the glass shears of the present invention may be conveniently employed for simultaneously cutting or severing gobs from multiple glass streams issuing from multiple or ganged outlet orifices.

It will now be assumed that the blades 15 and 16 of the glass shears of the invention are in their normal or retracted positions shown in FIGS. 1 and 2 with the cutting edges 17 and 18 of such blades disposed substantially equidistant from the axial centerline (131) or the longitudinal axis (131) of orifice 14 or glass stream 13, respectively, and that the last actuation of motor means 96 was such that output shaft 99 thereof was last actuated or rotated in its counterclockwise direction (viewing FIG. 2). It will be further assumed that a sufficient length or volume of glass stream 13 has been issued from orifice 14 to provide a gob of the desired size and, therefore, it is time for a period of actuation of the glass shears. Under such assumptions, pressurized fluid is connected to be supplied to fluid conduit 122 while fluid conduit 125 is connected to the previously mentioned fluid sink. Such connections may, for example, be controlled by the usual timing drum or programmer such as is usually employed for controlling the issuance of the glass stream such as 13 from an outlet orifice such as 14. The energization of motor means 96 by said pressurized fluid supplied to conduit 122 causes rotation of output shaft 99 of the motor means in a clockwise direction and such rotation, in turn, imparts through chain 120, and sprocket 102 and gear wheel 116, clockwise rotation of gear wheels 42 and 44 associated with shear blade 15, and through sprocket 103 and gear wheel 117 corresponding rotation of gear wheels 72 and 74 associated with shear blade 16. As a result shear blades 15 and 16 are rotated through curved paths of travel indicated by the arrows shown in FIGS. 5 through 9 of the drawings, such drawing figures illustrating different positions of the shear blades at different points in said curved paths of travel and at different stages in the cutting of a gob from said molten glass stream.

Figure 7:
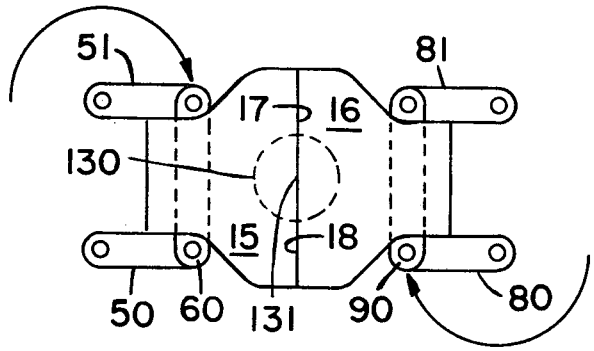
Figure 8:
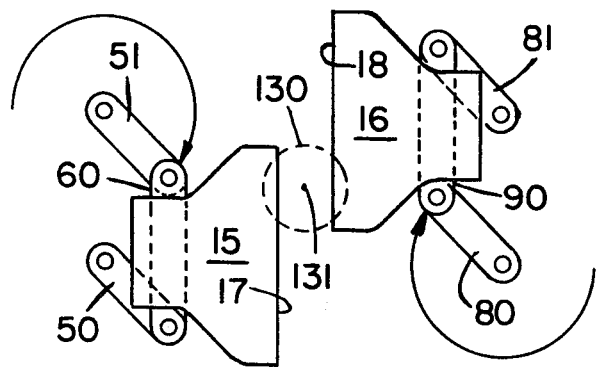
Figure 9:
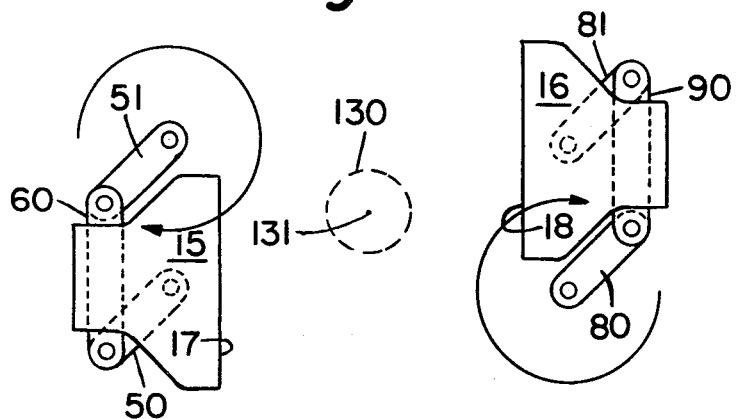

Referring to FIG. 7, it is pointed out that the cutting edges 17 and 18 of shear blades 15 and 16, respectively, momentarily come into at least near contact with each other at the 180° point of the curved paths of movement of the shear blades and the desired gob is thereby cut from the molten glass stream such as 13 shown in FIG. 1. Following such actuation of cutting edges 17 and 18, and the resultant severing or cutting of the desired gob, shear blades 15 and 16 are continued to be moved through their curved paths of travel as illustrated in FIGS. 8 and 9 until they are returned to their normal or completely opened positions shown in FIGS. 1 and 2.

When glass stream 13 has again flowed for a sufficient length of time to provide another sufficient length or volume of such stream to provide a gob of the desired size, pressurized fluid conduit 125 is connected to the pressurized fluid source by the previously mentioned timing drum or programmer, and conduit 122 is simultaneously connected to the previously mentioned fluid sink. Motor means 96 is thereby energized or actuated to cause rotation of output shaft 99 in a counterclockwise direction, and movement of shear blades 15 and 16 through their curved paths of travel in a direction opposite to that previously described, that is, in a direction such that various points in such movement of the shear blades are illustrated by viewing FIGS. 9 through 5 in that order, and by viewing FIGS. 1 and 2 as again illustrating the normal or completely opened positions of the shear blades. Shear blades 15 and 16 are similarly moved through their curved paths of travel in clockwise and counterclockwise directions, respectively, during alternate ones of a continued succession of actuations of the blades in cutting a succession of gobs from the molten glass stream as is now believed readily apparent.

It is pointed out that the maximum diameter of the molten glass stream which may be severed by the glass shears is limited by the length of the cutting edges of the blades and that blades with longer cutting edges may be provided for cutting glass streams having diameters greater than that illustrated. However, shear blades having cutting edges with lengths proportional to that illustrated in FIGS. 5 through 9 may be used for cutting gobs from a glass stream having a diameter correspondingly proportional to stream 130 shown in such drawing figures, or for cutting gobs from any glass stream of any smaller diameter than said proportional diameter of glass stream 130. It is also pointed out that the cutting edges of the shear blades of the present invention are moved with slicing motions thereof towards and away from the outlet orifice axial centerline 131 or the longitudinal axis 131 of the molten glass stream. That is to say, the cutting edge of each shear blade is moved into and substantially halfway through the molten glass stream with a slicing motion of the respective cutting edge, such movement of each respective cutting edge being performed simultaneously with such motion of the other cutting edge.

Although there is herein shown and described in detail only one form of molten glass shears embodying the invention, it will be understood that various changes and modifications may be made therein within the purview of the appended claims without departing from the spirit and scope thereof.

I claim:

1. Shears for separating or cutting gobs or mold charges of molten glass from a parent stream thereof issuing from an outlet orifice, such shears comprising:

(A) first and second shear blades each having a substantially straight cutting edge, such edges oriented in a parallel and facing coplanar relationship with each other below said orifice and substantially equidistant from the axial centerline of such orifice;
   (B) motor means including an output shaft; and
   (C) means coupling said output shaft of said motor means with said shear blades for alternately and simultaneously moving said cutting edges towards and away from momentary near wiping contact with each other at said axial centerline while maintaining said parallel and facing coplanar relationship of said edges.

2. Molten glass shears for cutting gobs or mold charges from a parent stream of glass issuing from an outlet orifice, such shears comprising, in combination:

(A) a first shear blade disposed below said orifice and having a substantially straight cutting edge positioned a selected distance from the axial centerline of said orifice;
   (B) a second shear blade disposed below said orifice opposite said first blade and having a substantially straight cutting edge positioned a selected distance from the axial centerline of said orifice, such cutting edge facing and paralleling said cutting edge of said first shear blade with coplanar orientation between such edges;
   (C) motor means including an output shaft; and
   (D) means coupling said output shaft of said motor means with said blades for imparting substantially equal movement of said cutting edges of such blades through paths of travel towards and away from said axial centerline of said orifice with slicing motions while maintaining the parallel and facing coplanar orientation of such cutting edges.

3. Molten glass shears as in claim 2 and in which said cutting edges come into momentary near contact with each other at the end of their movements towards said axial centerline of said orifice.

4. Molten glass shears as in claim 2 and in which said slicing motions of said cutting edges are in opposite directions in relation to each other.

5. Molten glass shears as in claim 2 and in which said paths of travel of said cutting edges of said blades are curved paths of travel.

6. Molten glass shears as in claim 3 and in which said slicing motions of said cutting edges are in opposite directions in relation to each other.

7. Molten glass shears as in claim 3 and in which said paths of travel of said cutting edges of said blades are curved paths of travel.

8. Molten glass shears as in claim 4 and in which each said cutting edge is alternately moved through its said curved path of travel in clockwise and counterclockwise directions.

9. Molten glass shears as in claim 4 and in which said paths of travel of said cutting edges of said blades are curved paths of travel.

10. Molten glass shears as in claim 5 and in which each said cutting edge is alternately moved through its said curved path of travel in clockwise and counter clockwise directions.

11. Molten glass shears as in claim 5 and in which said slicing motions of said cutting edges are in opposite directions in relation to each other.

12. Molten glass shears as in claim 7 and in which each said cutting edge is alternately moved through its said curved path of travel in clockwise and counterclockwise directions.

13. A method of severing a gob or mold charge of molten glass from a parent stream of such glass issuing from an outlet orifice, such method comprising, (A) moving into and substantially halfway through said molten glass stream with a slicing motion of a first straight cutting edge oriented during said motion at a right angle to the longitudinal axis of such glass stream; and (B) moving into and substantialy halfway through said molten glass stream with a slicing motion of a second cutting edge facing and paralleling said first cutting edge in a coplanar relationship therewith during said slicing motions, said movements being performed simultaneously.

14. The method in accordance with claim 13 and including the further step of retracting said cutting edges from the flow path of said glass stream immediately following the severance of a gob from such stream.

15. A method of severing a succession of gobs or mold charges of molten glass from a parent stream thereof flowing from an outlet orifice, such method comprising;
(A) providing first and second straight cutting edges on opposite sides of said glass stream with such edges in a facing and parallel coplanar orientation with each other at a selected angle to the longitudinal axis of such stream;
(B) moving said first and second cutting edges with slicing motions thereof, in corresponding directions, into and substantially halfway through said molten glass stream to sever a gob therefrom while maintaining said orientation of said edges, and then continuing said motions of said cutting edges while retracting such edges out of the flow path of the remainder of said glass stream; and, thereafter,
(C) successively repeating step B to sever additional successive gobs from said glass stream.

16. A method of severing a succession of gobs or mold charges of molten glass from a parent stream thereof flowing from an outlet orifice, such method comprising;
(A) providing first and second straight cutting edges on opposite sides of said glass stream with such edges in a facing and parallel coplanar orientation with each other at a right angle to the longitudinal axis of such stream;
(B) moving said first and second cutting edges, with slicing motions thereof in first and second directions respectively, into and substantially halfway through said molten glass stream to sever a gob therefrom while maintaining said orientation of said edges, and then continuing said motions of said cutting edges in said first and second directions while retracting such edges out of the flow path of the remainder of said glass stream;
(C) subsequently moving said first and second cutting edges, with slicing motions thereof in said second and first directions, respectively, into and substantially halfway through said molten glass stream to sever a succeeding gob therefrom while maintaining said orientation of said edges, and then continuing said motions of said cutting edges in said second and first directions while retracting such edges out of the flow path of the remainder of said glass stream; and, thereafter,
(D) successively and alternatingly repeating steps B and C to sever additional successive gobs from said glass stream.

17. Shears for separating or cutting gobs or mold charges of molten glass from a parent stream thereof issuing from an outlet orifice, such shears comprising;
(A) first and second shear blades each having a cutting edge, such edges oriented in a generaly facing relationship with each other below said orifice and substantially equidistant from the axial centerline of such orifice;
(B) motor means including an output shaft; and
(C) means coupling said output shaft of said motor means with said shear blades for alternately and simultaneously moving said cutting edges towards and away from at least near wiping contact with each other at said axial centerline while maintaining said facing relationship of said edges.

18. Molten glass shears for cutting gobs or mold charges from a parent stream of glass issuing from an outlet orifice, such shears comprising, in combination;
(A) a first shear blade disposed below said orifice and having a cutting edge positioned a selected distance from the axial centerline of said orifice;
(B) a second shear blade disposed below said orifice opposite said first blade and having a cutting edge positioned a selected distance from the axial centerline of said orifice, such cutting edge generally facing said cutting edge of said first shear blade;
(C) motor means including an output shaft; and
(D) means coupling said output shaft with said blades for imparting substantially equal movement of said cutting edges of such blades through paths of travel towards and away from said axial centerline of said orifice with slicing motions while maintaining said facing relationship of such cutting edges.

19. Molten glass shears as in claim 18 and in which said slicing motions of said cutting edges are in opposite directions in relation to each other.

20. Molten glass shears as in claim 18 and in which said paths of travel of said cutting edges of said blades are curved paths of travel.

21. Molten glass shears as in claim 20 and in which each said cutting edge is alternately moved through its said curved path of travel in clockwise and counterclockwise directions.

22. A method of severing a gob or mold charge of molten glass from a parent stream of such glass issuing from an outlet orifice, such method comprising,
(A) moving into and substantially halfway through said molten glass stream with a slicing motion of a first cutting edge generally oriented during said motion at a selected angle to the longitudinal axis of such glass stream; and
(B) moving into and substantially halfway through said molten glass stream with a slicing motion of a second cutting edge generally facing said first cutting edge during said slicing motions, said movements being performed simultaneously.

23. The method in accordance with claim 22 and including the further step of retracting said cutting edges from the flow path of said glass stream immediately following the severance of a gob from such stream.

24. A method of severing a succession of gobs or mold charges of molten glass from a parent stream thereof flowing from an outlet orifice, such method comprising;
(A) providing first and second cutting edges on opposite sides of said glass stream with such edges in a generally facing orientation with each other and each generally at a right angle to the longitudinal axis of such stream;
(B) moving said first and second cutting edges with slicing motions thereof, in corresponding directions, into and substantially halfway through said molten glass stream to sever a gob therefrom while maintaining said orientation of said edges, and then continuing said motions of said cutting edges while retracting such edges out of the flow path of the remainder of said glass stream; and, thereafter,
(C) successively repeating step B to sever additional successive gobs from said glass stream.

25. A method of severing a succession of gobs or mold charges of molten glass from a parent stream thereof flowing from an outlet orifice, such method comprising;
(A) providing first and second cutting edges on opposite sides of said glass stream with such edges in a generally facing orientation with each other and each generally at a right angle to the longitudinal axis of such stream;
(B) moving said first and second cutting edges, with slicing motions thereof in first and second directions respectively, into and substantially halfway through said molten glass stream to sever a gob therefrom while maintaining said orientation of said edges, and then continuing said motions of said cutting edges in said first and second directions while retracting such edges out of the flow path of the remainder of said glass stream;

(C) subsequently moving said first and second cutting edges with slicing motions thereof in said second and first directions, respectively, into and substantially halfway through said molten glass stream to sever a succeeding gob therefrom while maintaining said orientation of said edges, and then continuing said motions of said cutting edges in said second and first directions while retracting such edges out of the flow path of the remainder of said glass stream; and, thereafter, (D) successively and alternatingly repeating steps B and C to sever additional successive gobs from said glass stream.

References Cited

UNITED STATES PATENTS

| | | | |
|---|---|---|---|
| 1,174,173 | 3/1916 | Manning | 65—334 |
| 2,092,865 | 9/1937 | Wadsworth | 65—133 |
| 2,271,004 | 1/1942 | Gray | 65—334 X |

ARTHUR D. KELLOGG, Primary Examiner

U.S. Cl. X.R.

65—332, 334; 83—600, 643